United States Patent
Oguchi et al.

(10) Patent No.: US 8,221,002 B2
(45) Date of Patent: Jul. 17, 2012

(54) BEARING APPARATUS

(75) Inventors: Toshiaki Oguchi, Fujisawa (JP); Keisuke Yokoyama, Fujisawa (JP)

(73) Assignee: NSK Ltd., Tokyo (JP)

( * ) Notice: Subject to any disclaimer, the term of this patent is extended or adjusted under 35 U.S.C. 154(b) by 689 days.

(21) Appl. No.: 12/373,199

(22) PCT Filed: Mar. 13, 2007

(86) PCT No.: PCT/JP2007/054898
§ 371 (c)(1),
(2), (4) Date: Jan. 9, 2009

(87) PCT Pub. No.: WO2008/007478
PCT Pub. Date: Jan. 17, 2008

(65) Prior Publication Data
US 2009/0279823 A1   Nov. 12, 2009

(30) Foreign Application Priority Data
Jul. 11, 2006  (JP) ................................ 2006-190198

(51) Int. Cl.
*F16C 33/66* (2006.01)
(52) U.S. Cl. .................. 384/448; 277/319; 277/919
(58) Field of Classification Search .............. 384/448; 277/319, 919
See application file for complete search history.

(56) References Cited

U.S. PATENT DOCUMENTS
2002/0051593 A1   5/2002  Oka
2006/0170551 A1   8/2006  Nakamura et al.

FOREIGN PATENT DOCUMENTS
| DE | 199 12 135 | * 12/1999 |
|---|---|---|
| EP | 1 965 107 | * 9/2008 |
| JP | 7-333073 A | 12/1995 |
| JP | 2002-130263 A | 5/2002 |
| JP | 2005-024441 A | 1/2005 |
| JP | 2005-042895 A | 2/2005 |

* cited by examiner

*Primary Examiner* — William C Joyce
(74) *Attorney, Agent, or Firm* — Miles & Stockbridge P.C.

(57) ABSTRACT

A bearing apparatus includes an outer ring (11), an inner ring (12), rolling elements (13) disposed between the two rings, and a seal (15) attached to one of the outer ring and the inner ring and extending toward the other ring. A temperature sensor is fitted to the seal, and hence a temperature of the seal contacting with a rotary wheel can be directly measured. Accordingly, if the temperature measured by the temperature sensor rapidly rises, this implies that some inconvenience might occur, and necessary countermeasures such as immediately stopping an apparatus using the bearing apparatus can be taken before the explicit inconvenience occurs.

6 Claims, 1 Drawing Sheet

BEARING APPARATUS

TECHNICAL FIELD

The present invention relates generally to a bearing apparatus including a temperature sensor, and more particularly to a bearing apparatus suitable for use of an electrical component of an automobile, an alternator serving as an auxiliary engine, an intermediate pulley, an electromagnetic clutch for a car air-conditioner, a water pump, a hub unit, an electromagnetic clutch for a gas heat pump, a compressor, a linear guide apparatus, a ball screw, or the like.

BACKGROUND ART

A bearing apparatus for supporting rotary parts has hitherto been, when once incorporated, subjected to none of periodic inspections in many cases, and in such a case it often happened that an interior thereof was inspected for the first time just when inconvenience occurred due to abnormality in temperature. Further, in the case of the bearings for a railway vehicle, a wind turbine, or the like, the bearing apparatus and other portions are decomposed and inspected after being used for a predetermined period of time. It is therefore difficult to predict the inconvenience due to the abnormality in temperature beforehand. An attempt (refer to Japanese Patent Laid-Open Publication No. 2002-130263) in this respect is made to detect the abnormality of the bearing in temperature before the critical inconvenience occurs by measuring a change of the temperature with a temperature sensor attached to the bearing apparatus.

DISCLOSURE OF THE INVENTION

However, the technology of Japanese Patent Laid-Open Publication No. 2002-130263 involves using a stacked thermistor having a fixed thickness and is therefore restricted in terms of a fitting space, and it is difficult to measure a temperature of an originally-want-to-measure portion of the bearing. Further, a multiplicity of manufacturing processes thereof entails a considerable cost, which leads to the difficulty of being applied to the general-purpose bearings. Moreover, for example, if capable of directly measuring the temperature of the lip contacting with the rotary wheel, the abnormality in temperature can be detected beforehand. Generally, however, the lip is composed of a rubber and takes a thin-and-easy-to-flex shape, and it therefore follows that the temperature sensor is provided on the lip with the difficulty.

It is an object of the present invention, which was devised in view of the problems in the prior arts, to provide a bearing apparatus including a downsized temperature sensor contrived to previously predict occurrence of the inconvenience due to the abnormality in temperature, without restricting a fitting space by, for example, forming a thermocouple on a high-molecular thin film, showing a quick response because of being incorporated in whichever portions of the bearing, and exhibiting excellent mass-productivity.

A bearing apparatus according to the present invention comprises an outer ring, an inner ring, rolling elements disposed between the two rings, and a seal attached to one of the outer ring and the inner ring and extending toward the other ring, wherein a temperature sensor is fitted to the seal.

According to the present invention, the temperature sensor is fitted to the seal attached to one of the outer ring and the inner ring and extending toward the other ring, and hence a temperature of the seal contacting with the rotary wheel can be directly measured. Accordingly, if the temperature measured by the temperature sensor rapidly rises, this implies that some inconvenience might occur, and necessary countermeasures such as immediately stopping an apparatus using the bearing apparatus can be taken before the explicit inconvenience occurs.

In particular, the prediction of the inconvenience can be further facilitated by fitting the temperature sensor to the lip portion of the seal.

BEST MODE FOR CARRYING OUT THE INVENTION

Figure 1:
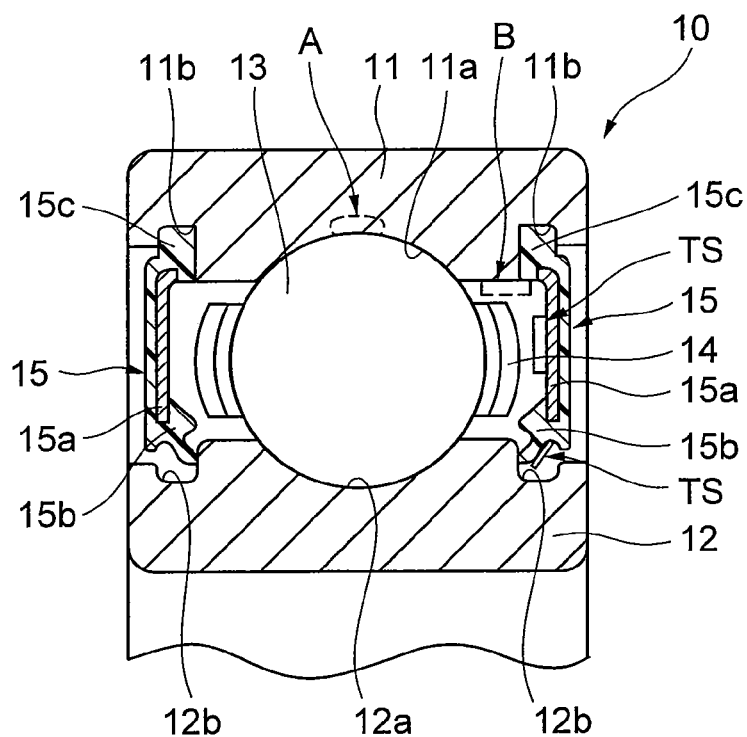
FIG. 1 is a sectional view of a rolling apparatus as viewed in a direction of an axis line according to the present embodiment.

Next, an embodiment of the present invention will hereinafter be described with reference to the drawings. FIG. 1 is a sectional view of a rolling bearing as viewed in a direction of an axis line, which is used in the present embodiment. A rolling bearing (angular ball bearing) 10 includes an outer ring 11, an inner ring 12, balls 13 serving as rolling element disposed between the two rings 11 and 12, a retainer 14 which retains the balls 13 at equal intervals in a peripheral direction, and seals 15, 15 disposed on both edge sides in the direction of the axis line between the two rings 11 and 12. The outer ring 11 has, along its inner periphery, a raceway surface 11a and fitting grooves 11b, 11b formed on both sides with the raceway surface 11a being interposed therebetween. The inner ring 12 has, along its outer periphery, a raceway surface 12a and fitting grooves 12b, 12b formed on both sides with the raceway surface 12a being interposed therebetween. The ball 13 may be composed of ceramic such as silicon nitride and silicon carbide.

Each seal 15 includes a cored bar 15a constructed of a metal plate (SPCC, SECC, or the like) taking substantially a doughnut-like shape, and having a main portion excluding a hook, and the hook, a lip portion 15b composed of a synthetic rubber (such as a nitrile rubber, an acrylic rubber, a silicone rubber and a fluoro rubber) that is integrally formed by galvanization on an inner-diametrical side of the cored bar 15a, and a synthetic rubber fitting portion 15c that is integrally formed by galvanization on an outer-diametrical side of the cored bar 15a. The seal 15 is attached to the outer ring 11 by engaging with the fitting grooves 11b from outside while getting the fitting portion 15c elastically deformed. In such a state, a front end of the lip portion 15b contacts with the sealing groove 12b.

In the present embodiment, temperature sensors TS are secured by a bonding agent to an inner side of the cored bar 15a and to an outer side of the lip portion 15b in one single seal 15. Though not illustrated, the wiring from the temperature sensor TS is drawn out to an external face of the seal 15 and to the outside through the outer ring 11. Note that the temperature sensor TS is depicted in exaggeration in terms of its thickness in FIG. 1.

Figure 2:
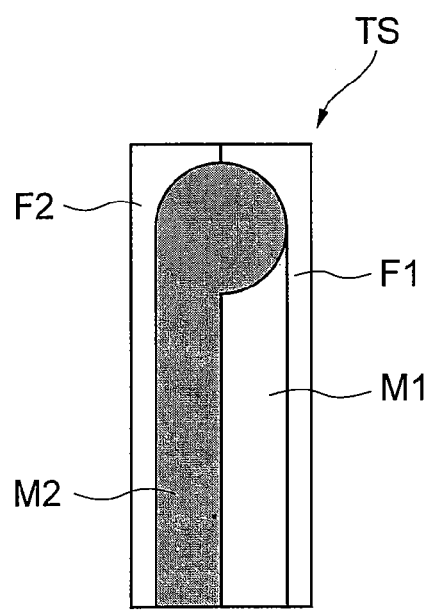
FIG. 2 is a sectional view showing a temperature sensor TS in enlargement in FIG. 1.

FIG. 2 is an enlarged sectional view showing the temperature sensor TS in enlargement. Referring to FIG. 2, the temperature sensor TS is a thermocouple constructed by stacking two types metal thin films M1, M2 over a high-molecular film F1 and covering these thin films with a homogeneous or heterogeneous high-molecular film F2 by thermo-compression bonding or by use of a bonding agent. Taking heat-resistance and elastic modulus into consideration, it is preferable that the high-molecular film be composed of PET (polyethylene terephthalate), PPS (poly phenylene sulfide), PI (polyimide), PEEK (polyetheretherketone), or the like. A thickness of the high-molecular film is preferably equal to or smaller than 1,000 μm in terms of considering a limited fitting space. A preferable method of forming the thin film is, though not limited in particular, a sputtering process and a vacuum deposition process. A combination of the metals of the thermocouple is not particularly limited, and one example is a combination of copper and nickel. It is desirable that a size of the measuring portion is equal to or larger than $1 \times 10^{-10} m^2$ but equal to or smaller than $1 \times 10^{-6} m^2$. This is because it is difficult to perform a highly-accurate measurement, wherein a response upon measuring of the temperature declines if the size of the measuring portion exceeds $1 \times 10^{-6} m^2$, and detection sensitivity decreases if equal to or smaller than $1 \times 10^{-10} m^2$.

According to the present embodiment, the seal 15 is attached with the temperature sensor TS, and hence the temperature of the lip portion 15b contacting with the inner ring 12 can be directly measured. Accordingly, if the temperature measured by the temperature sensor TS rapidly rises, this implies that some inconvenience might occur, and a necessary countermeasures such as immediately stopping the apparatus using the rolling bearing can be taken before the explicit inconvenience occurs.

The present invention has been discussed so far by way of the embodiment but should not be construed in the way of being limited to the embodiment and can be, as a matter of course, properly modified and improved. For example, the temperature sensor TS may be, as depicted by dotted lines, disposed on the raceway surface 11a (portion A) of the outer ring 11 and an inner peripheral surface (portion B) other than the raceway surface 11a. Further, the temperature sensor TS may be, without being limited to the thermocouple type, such a type, constructed of a thin film of platinum or the like, as to measure a change of resistance due to a change of the temperature.

INDUSTRIAL APPLICABILITY

As described above, the bearing apparatus according to the present invention is useful as the apparatus capable of taking, because of some inconvenience occurring if the temperature measured by the temperature sensor rapidly rises, the necessary countermeasures such as immediately stopping the apparatus using the bearing apparatus before the explicit inconvenience occurs.

What is claimed is:

1. A bearing apparatus comprising:
    an outer ring;
    an inner ring;
    rolling elements disposed between said outer ring and said inner ring; and
    a seal attached to one of said outer ring and said inner ring and extending toward the other ring,
    wherein a temperature sensor is fitted to a lip portion of said seal, and
    wherein said temperature sensor has only four films, said films consisting of a first high-polymer film, two types of metal thin films formed on said first high-polymer film, and a second high-polymer film formed on said metal thin films.

2. A bearing apparatus according to claim 1, wherein said lip portion contacts with said outer ring or said inner ring.

3. A bearing apparatus according to claim 1, wherein a second temperature sensor is fitted to a core metal portion of said seal.

4. A bearing apparatus according to claim 1, wherein a size of said temperature sensor is at least $1 \times 10^{-10} m^2$ and does not exceed $1 \times 10^{-6} m^2$.

5. A bearing apparatus according to claim 1, wherein a second temperature sensor is fitted to a core bar portion of said seal.

6. A bearing apparatus comprising:
    an outer ring;
    an inner ring;
    rolling elements disposed between said outer ring and said inner ring; and
    a seal attached to one of said outer ring and said inner ring and extending toward the other ring,
    wherein a first temperature sensor is fitted to a lip portion of said seal, and
    wherein a second temperature sensor is fitted to a core metal portion of said seal.

* * * * *